United States Patent [19]

Miller

[11] 4,319,089
[45] Mar. 9, 1982

[54] TELEPHONE ANSWERING MACHINE

[75] Inventor: Stanley F. Miller, Rocky Point, N.Y.

[73] Assignee: Quasar Microsystems, Inc., Brentwood, N.Y.

[21] Appl. No.: 166,164

[22] Filed: Jul. 7, 1980

Related U.S. Application Data

[63] Continuation of Ser. No. 957,649, Nov. 3, 1978, abandoned.

[51] Int. Cl.³ .............................................. H04M 1/64
[52] U.S. Cl. ................................... 179/6.06; 179/6.11; 179/6.13
[58] Field of Search ..................... 360/67, 71, 74.4; 369/28; 179/6.01, 6.03, 6.06, 6.13, 6.14, 6.11, 6.07

[56] References Cited

U.S. PATENT DOCUMENTS

| | | | |
|---|---|---|---|
| 3,539,728 | 11/1970 | Rubenstein | 179/6.13 |
| 3,725,589 | 4/1973 | Golden | 179/2 A |
| 3,935,390 | 1/1976 | Winterhalter | 179/6.14 |
| 3,943,292 | 3/1976 | Yokazawa | 179/6.13 |
| 3,977,023 | 8/1976 | Nakamura | 360/67 |

Primary Examiner—James W. Moffitt
Assistant Examiner—Alan Faber
Attorney, Agent, or Firm—Arthur L. Lessler

[57] ABSTRACT

A telephone answering machine utilizing a single magnetic tape to record both outgoing announcements and incoming messages. Stop tones are recorded as audio frequency signals at fixed intervals on the tape to define successive announcement/message segments, each segment containing a desired announcement followed by an interval for recording an incoming message. The stop tones also control tape movement and cause the machine to stop at the end of each tape section.

7 Claims, 5 Drawing Figures

TELEPHONE ANSWERING MACHINE

This application is a continuation of application Ser. No. 957,649, filed Nov. 3, 1978, now abandoned.

This invention relates to telephone answering machines, and more particularly to machines which utilize magnetic tape as the medium for storing outgoing announcements and incoming messages.

Telephone answering machines utilizing magnetic tape, in reels or cassettes, are presently widely available. Such machines, however, contain relatively complex timing and control circuitry, and require separate tapes (or a complex multi-track tape arrangement) for the outgoing announcement and the incoming message to be recorded.

Accordingly, an object of the present invention is to provide a telephone answering machine containing relatively simple timing and control circuitry as compared with prior art telephone answering machines.

Another object of the invention is to provide a telephone answering machine capable of operation with a single cassette having only one record/playback track.

As herein described, according to one aspect of the invention there is provided a telephone answering machine utilizing a single magnetic tape having a plurality of announcement information sections interleaved with a corresponding plurality of message information sections, said machine comprising: tape transport means; means for recording a desired announcement on each of said announcement information sections of said tape; announcement control means coupled to said transport means and responsive to a telephone ring signal for reproducing said announcement from one of said announcement information sections as a first audio signal; means for coupling said first audio signal to a telephone line; message recording means coupled to said transport means and responsive to a second audio signal on said telephone line for recording a corresponding message on the particular message information section of said tape adjacent and following said one announcement information section; timing means for disabling said announcement control means and enabling said message recording means a first predetermined time after occurence of said ring signal, and for disabling said message recording means a second predetermined time thereafter; and manually operable playback means coupled to said transport means for subsequently reproducing from said particular message information section of said tape an audible signal corresponding to said second audio signal.

Also herein described is a telephone answering machine utilizing magnetic tape means having announcement information and message information sections separated by audio frequency stop tone signals thereon, said machine comprising: tape transport means for receiving said magnetic tape means; means operatively associated with said transport means for recording audio signals on said tape means, said recording means including a microphone selectively operable in an announcement record mode of said machine; means operatively associated with said transport means for reproducing audio frequency signals from said tape means; a telephone ring detector; means for coupling said ring detector to a telephone line; means responsive to stop tone signals transduced by said reproducing means for generating timing control signals; means coupled to said ring detector for enabling said transport means when telephone ringing is detected; means coupled to said ring detector, responsive to said timing control signals and operative in an answer mode of said machine, for (i) enabling said reproducing means to reproduce signals from an announcement information section of said tape means when telephone ringing is detected, (ii) disabling said reproducing means and enabling said recording means to record signals on one of said message information sections of said tape means a predetermined time after said ringing is detected, and (iii) disabling said recording means in response to one of said timing control signals; means operative only in said answer mode for coupling audio signals generated by said reproducing means to said telephone line; means for coupling audio signals on said telephone line to said recording means, to record said telephone line audio signals on a message information section of said tape means; operative in said announcement record mode of said machine for (i) recording a stop tone on said tape and enabling said recording means to record signals from said microphone on an announcement information section of said tape means in response to a start signal, (ii) recording an audio frequency transfer tone on said tape a predetermined time after said start signal, and (iii) disabling said recording means after said transfer tone is recorded; and manually operable means including said reproducing means for audible playback of the audio signals from said telephone line recorded on a message information section of said tape means.

Figure 1:
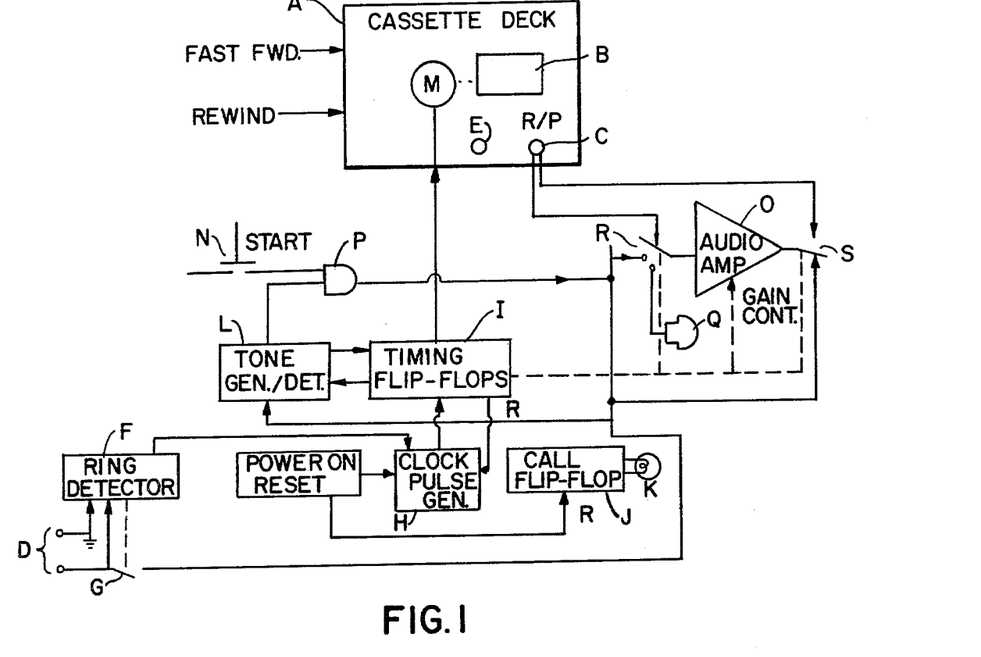
FIG. 1 is a simplified block diagram of a telephone answering machine according to a preferred embodiment of the invention.

As seen in FIG. 1, a cassette deck A contains a drive motor M which rotates the reels of a magnetic tape cassette B to provide record/playback, fast forward, off and rewind transport functions. Signals are transduced to and from the cassette B via a record/playback head C, and are erased from the tape prior to recording new signals thereon, by an erase head E.

The machine shown in FIG. 1 is coupled to telephone lines D, with a ring detector F and transformer T serving to isolate the remainder of the machine from the telephone lines. Transformer T is isolated from the telephone line via an isolation switch G, except when telephone ringing has been detected.

The ring detector F also enables a clock pulse generator H which in turn initiates operation of the timing flip-flops I and cassette deck A, to begin the answer mode sequence of operations. The call flip-flop J is coupled to the timing flip-flops I to actuate an indicator light K which is illuminated to indicate that an incoming call has been answered.

The tone generator/detector L is coupled to the timing flip-flops I to generate stop tones for defining announcement/message intervals on the cassette B, generating transfer tones for alerting the calling party that he may commence stating his message, and detecting stop tones previously recorded on the cassette B to control machine operation.

A start button N initiates machine operation in the record and playback modes, enabling the tone generator/detector via OR gate T to be coupled to the record/playback common audio amplifier O via an AND gate P.

A microphone Q is utilized to record desired announcements on the cassette B during the record mode, and the timing flip-flops I control the gain of the audio amplifier O to provide the optimum gain in both the record and playback conditions of the amplifier O. Switches R and S are controlled by the timing flip-flops I to enable the audio amplifier O to act as both a record and a playback amplifier, depending upon the desired mode of operation.

Figure 3A:
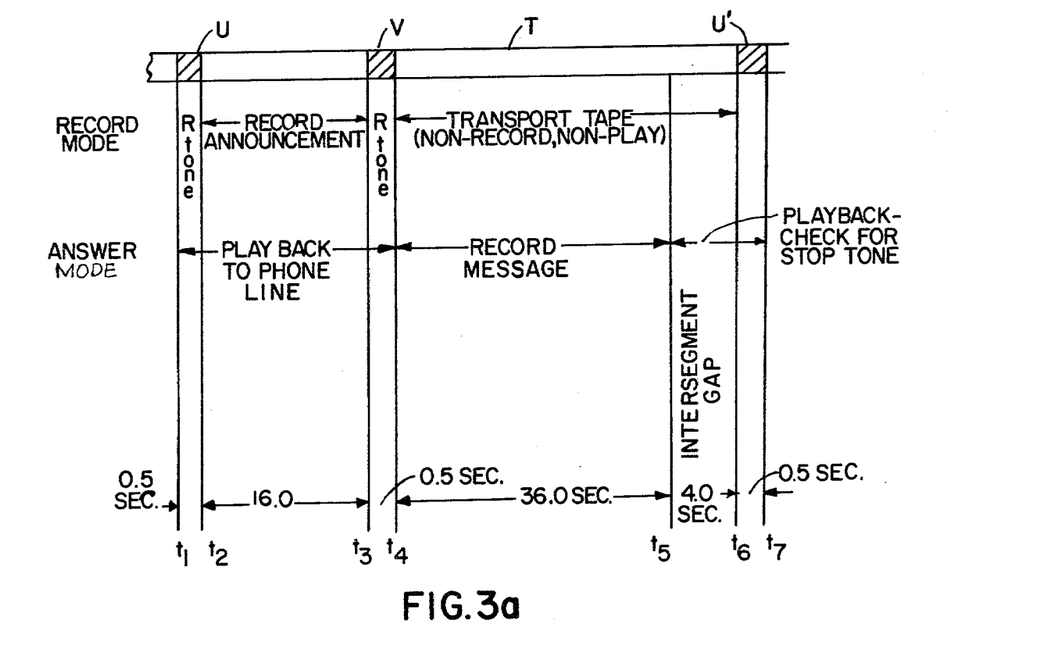
FIG. 3a illustrates the format in which announcements, messages and tone signals are disposed on the tape utilized in the telephone machine of FIGS. 1 and 2.

A section of announcement/message interval of a magnetic tape T illustrating the manner of tape utilization in the record and answer modes of the machine, is illustrated in FIG. 3a. The basic tape utilization format involves provision of a 0.5 second duration 1 kHz. audio frequency stop tone U prior to the recorded announcement, a 16 second interval for storing the recorded outgoing announcement, a 0.5 second 1 kHz. audio frequency transfer tone V, a 36 second interval for recording the incoming message, a 4 second intersegment gap during which the tape transport operates in playback mode to check for the stop tone, and a 0.5 second stop tone U'.

The stop tone U and transfer tone V are automatically placed on the tape T when an announcement is recorded, with the next stop tone U' being placed on the tape at the time the suceeding announcement on the tape is recorded. Due to the interleaved nature of the announcements and messaage, it is necessary to record a separate announcement for each time the telephone is to be answered. That is, for an anticipated 10 incoming calls, the announcement must be recorded 10 times on the tape, in successive announcement/message intervals.

Figure 2A:
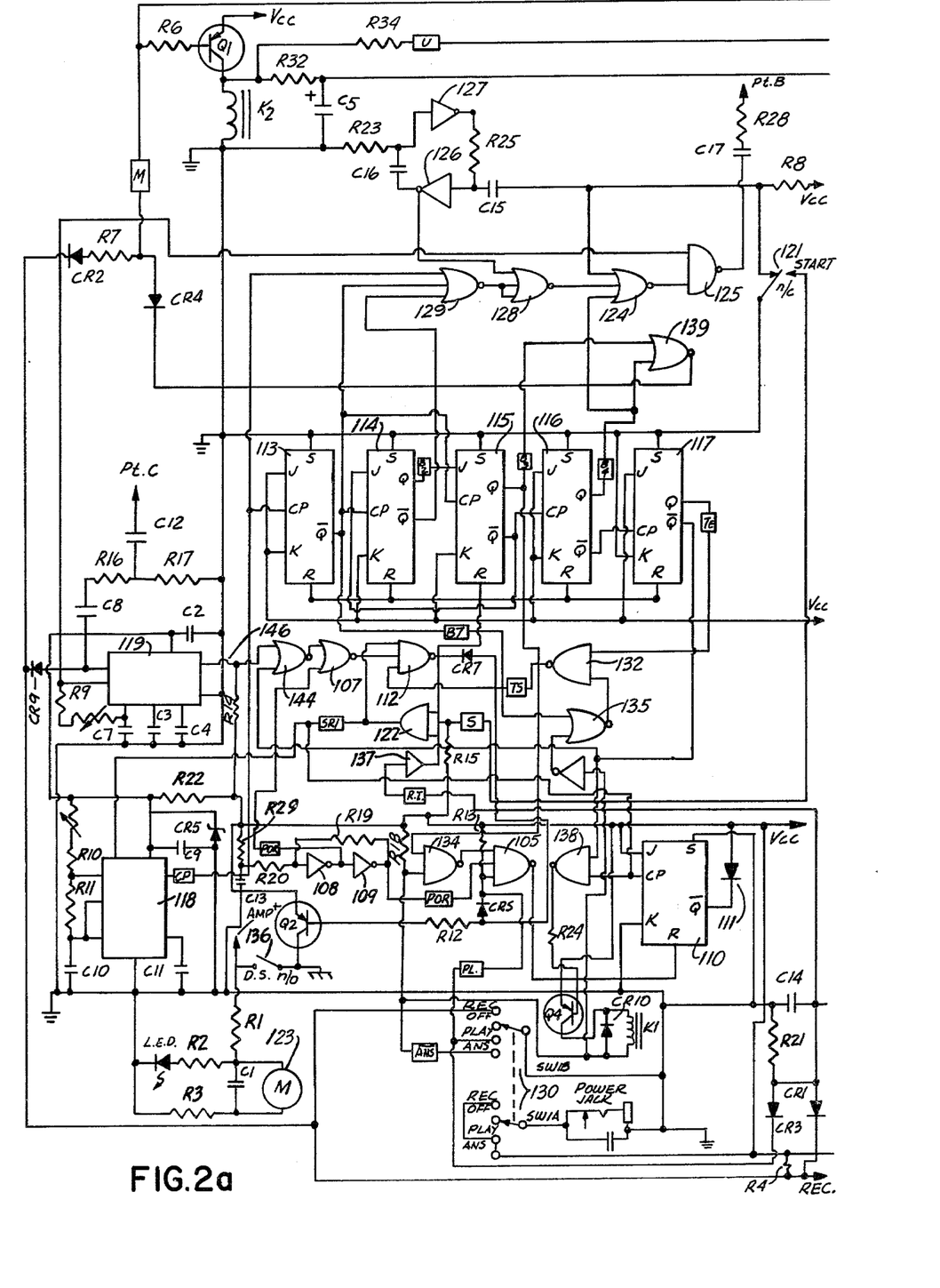
FIGS. 2a and 2b (hereinafter collectively referred to as FIG. 2) comprise a functional schematic diagram of the telephone answering machine shown in FIG. 1.
Figure 2B:
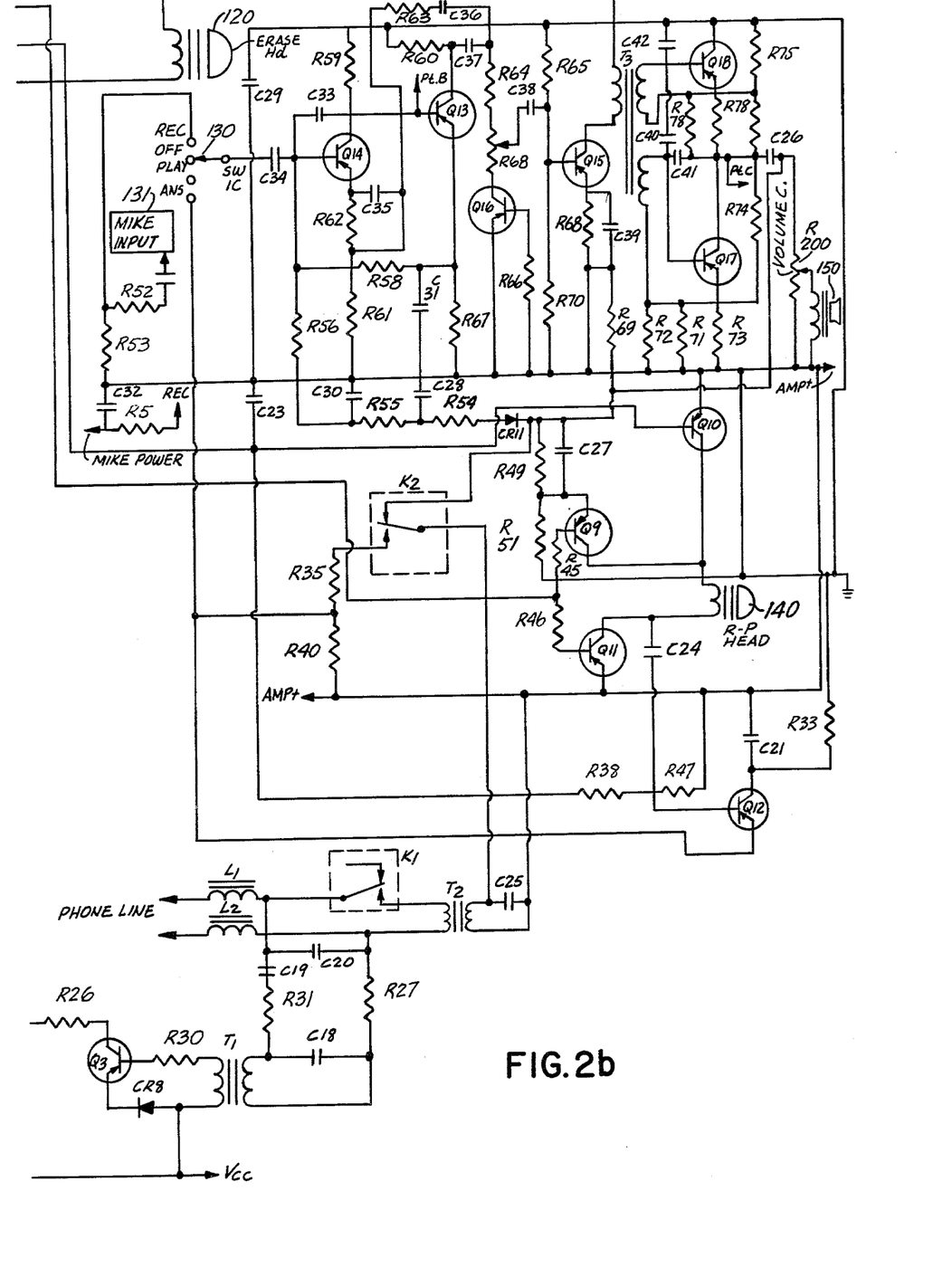

The invention will be more clearly understood from the following description with respect to FIG. 2, which is a detailed functional schematic diagram of a telephone answering machine according to the invention.

The device shown in FIG. 2 is an automatic telephone answering system which, completely unattended, answers incoming telephone calls, transmits prerecorded messages of 16 seconds in duration, and records incoming messages of 36 seconds duration. Both the prerecorded outgoing messages and the recorded incoming calls are contained on a single standard C-60 cassette having a recording time of 30 minutes per side at 1⅞ inches per second. In addition to automatic call answering and recording, the unit provides the capability of screening incoming calls. Since the device employs a standard cassette player, it can be used to play back prerecorded educational or music-program cassettes, as well.

The pertinent specifications of the system shown in FIG. 2 are as follows:

| a. | Message Record Format | Outgoing and incoming messages interleaved on single C-60 cassette. |
|---|---|---|
| b. | Message Lengths | |
| | (1) Outgoing | 16 seconds maximum, fixed cycle |
| | (2) Incoming | 36 second maximum, fixed cycle. |
| c. | Maximum Capacity | 30 outgoing and 30 incoming messages |
| d. | Ring Delay | Calls answered on second to third ring. |

The controls and indicators of the system and their functions are as follows:

Function Switch

The function switch is a four position switch which selects the unit's mode of operation. Depending on the setting of the function switch, the unit can either record an announcement on the cassette tape, play back a previously recorded tape, or automatically answer the telephone, play a prerecorded announcement and record the incoming message. Function switch positions are: (1) Record, (2) Off, (3) Play, and (4) Answer.

Tape Deck Pushbuttons

The three tape deck pushbuttons enable the application of power to the tape deck motor, and mechanically control the speed and direction of tape drive. The functions of these pushbutton switches are as follows:

a. PLAY

When depressed, drives tape in the forward direction to permit either recording or playback. In addition, depressing the PLAY button releases the REW pushbutton.

b. REW (REWIND)

When depressed, drives tape in the reverse direction at high speed to rewind the tape to the starting point. Depressing the REW pushbutton releases the PLAY pushbutton.

c. FAST FWD (FORWARD)

When pressed and held, this momentary pushbutton drives the tape in the forward direction at a speed faster than when in PLAY. In addition, pressing the FAST FWD pushbutton releases the REW or PLAY pushbutton, if depressed. Therefore, momentarily pressing and releasing the FAST FWD pushbutton stops the tape.

START Pushbutton

The START pushbutton is a momentary switch, used in the record mode to initiate the recording of an announcement.

VOLUME Control

Adjusts the level of the speaker output when playing back tapes or when monitoring incoming calls. Does not affect the record level when recording or the output level transmitted over the telephone line.

CALL Indicator

Light-emitting Diode (LED) which performs two functions. When the unit is placed in the ANSWER mode and left unattended, the CALL indicator lights to indicate that a call has been received. It remains illuminated until the unit is placed in the PLAY mode, to play back the received calls.

In the RECORD mode, each time the START pushbutton is pressed and released, the CALL indicator lights for 16 seconds to indicate to the operator the proper time to speak into the unit's microphone and record his announcement.

IN USE indicator

Light-emitting Diode (LED) which lights when power is applied to the tape deck motor.

FUNCTIONAL DESCRIPTION

The electronic circuits of the system are divided into two functional sections: (1) control logic, and (2) analog amplifier and switching circuits. The logic accepts inputs from the top panel switches, and from the analog circuits. It then provides outputs to the analog circuits to energize the tape deck motor to record or play back audio information on the tape cassette, as required by the selected mode of operation. The analog circuits interface with the telephone line, detect the incoming ring signal, provide audio amplification for playback and recording, accept microphone inputs, and drive the record/playback and erase heads.

Modes of Operation

Record Mode (REC)

In the RECORD Mode the Function switch is set to the REC position and the PLAY pushbutton is depressed. To record an announcement the START pushbutton is momentarily pressed, lighting the CALL indicator and applying power to the tape deck motor. On release of the START pushbutton the unit records a 1 kHz. stop tone on the tape for 0.5 second. After the stop tone is recorded, the unit continues driving the tape, allowing the operator to record his outgoing announcement on the tape using the unit's builtin microphone. After an additional 16 seconds, the unit records another 0.5 second, 1 kHz. tone (the "transfer" tone) on the tape. After the transfer tone is completed (17 seconds after release of the START pushbutton), the CALL indicator is extinguished. However, the tape deck remains energized and tape is driven for an additional 40 seconds. This 40 seconds of blank tape contains 36 seconds of recording time for the incoming message plus a 4 second intersegment gap. The gap, which is the last 4 seconds of the segment, provides a buffer area between the present segment and the next segment on the tape. After the tape has been driven for the additional 40 seconds the tape deck is de-energized.

Note that the record cycle records one announcement/message segment, consisting of a leading 0.5 second step tone, 16 seconds of tape for the user's announcement, a 0.5 second transfer tone, 36 seconds of tape for recording the incoming message, and 4 seconds of intersegment gap. This announcement/message segment, in the answer mode, will permit the machine to transmit one announcement and record one incoming message. To permit the unit to answer multiple calls, the user must repeat the procedure just described to record multiple segments on the tape. When the last segment is recorded, the user initiates another record cycle by pressing the START pushbutton. This places a stop tone on the tape following the last usable segment on the tape. The trailing stop tone (which in reality, is the leading stop tone of the following segment) is used in the Answer mode to detect the segment end, and shut down.

Answer Mode (ANS)

In the ANSWER mode, the tape containing the announcement/message segments is fully rewound, the Function switch is set to the ANS position, and the PLAY pushbutton is depressed. When the telephone ring signal is detected, on the second or third ring, the telephone line is seized and the tape deck is energized. During the first 17 seconds of the answer cycle, the logic places the analog circuits in the playback condition and couples the playback audio to the telephone line. Therefore, the tones and announcement recorded by the user during the first part of the announcement/message segment are heard by the calling party. After the 17 second have expired, the logic switches the analog circuits into a record condition and routes the audio from the telephone line to the record/play head. After an additional 36 seconds the logic switches the analog circuits back to the playback condition, releases the telephone line and monitors the tape for the trailing stop tone. Upon detecting the stop tone the tape deck is turned off, and the unit resets and waits for the next call.

Play Mode

In the PLAY mode the unit functions as a normal cassette player. Under control of the tape deck pushbuttons the cassette may be rewound, played back or driven fast forward.

CIRCUIT DESCRIPTION

General

The schematic digram of FIG. 2, shows the unit analog and amplifier circuits, and the digital logic control circuits. The integrated logic circuits carry number reference designations, for example, "2", "3", etc. In referring to input and output pins on these circuits the circuit description combines the circuit reference designation and pin designation; for example, "inverter input 8-1" refers to pin 1 on hex inverter chip 8.

Power-On-Reset

Because the unit contains flip-flops and latches whose state is unknown when power is first applied, a power-on reset circuit is included to clear the machine at power turn-on. Resistor R29 and capacitor C13 detect the power-on condition and produce the Power On Reset (POR) signal. After supply power to the logic circuits has been applied, the voltage at the positive plate of C13 is below the logic threshold voltage, applying a logic ZERO to inverter input 108-1. Inverter output 108-2 goes to ONE, driving signal $\overline{POR}$ to ONE and POR to ZERO.

Signal $\overline{POR}$ drives NAND gate input 105-4 to ZERO. NAND gate output 105-6 goes to ONE, resetting the CALL flip-flop 110 and extinguishing the CALL indicator 111. In addition signal $\overline{POR}$ is fed back through R19 to inverter input 108-1 to enhance the switching of the signal; this acts as a Schmidt trigger giving some hysteresis to the POR signal. Signal POR is applied to NOR gate input 107-13, driving output 107-11 to ZERO and thereby resetting the SRI latch 112. Signal SRI, at NAND gate output 112-10 goes to ONE, clearing the timing flip-flops 113–116 and the TE (Time end) flip-flop 117. Signal SRI goes to ZERO, applying a ZERO to pin 4 of timer 118 and thereby resetting and disabling the timer. When C13 charges sufficiently to reach the logic threshold, signal $\overline{POR}$ returns to ONE, ending the power-on reset cycle.

Initial Conditions

To place the unit in the RECORD Mode, the Function switch is set to the REC position, and the PLAY pushbutton is depressed. Therefore, signal REC is ZERO (grounded through the Function switch) and the Deck switch is closed.

Since REC is ZERO, audio input pin 3 of the tone oscillator/detector 119 is grounded through diode CR 9, disabling the input during the record operation. In addition, REC at ZERO grounds the cathode of diode CR 2. Control line M goes low and, since its base is driven low, Q1 turns on. The collector current of Q1 energizes relay K2 and the erase head 120. The collector voltage of Q1 drives control line U HIGH.

Cycle Initiation

To initiate the RECORD cycle, the START pushbutton 121 is pressed and released. When pressed, the normally-open contact of the START switch closes, grounding signal START and applying a ZERO level to NAND gate input 122-2. The SRI latch 112-122 sets, placing signal SRI at a ONE level and $\overline{SRI}$ (at NAND gate output 112-10) at ZERO. With SRI at a ONE level, the reset input (pin 4) on the timer 118 is released, allowing the timer to turn on and produce clock pulses at its output (pin 3). Signal $\overline{SRI}$ at ZERO releases the reset inputs of the timing flip-flops 113–116 and the TE flip-flop 117 and turns on Q2, applying power to the tape deck motor 123. In addition, $\overline{SRI}$ sets the CALL flip-flop 110, lighting the CALL indicator 111. While the START pushbutton 121 is held pressed the voltage at the junction of R8 and C15 is at +VCC, applying a ONE to NOR gate input 124-11. Therefore, the Tone Enable signal, at NOR gate output 124-10, is held at ZERO, preventing the tone oscillator output produced at pin 119-5 from passing through to NAND gate output 125-3. Therefore, since pressing the START pushbutton 121 applies power to the tape deck motor 123 and inhibits the tone generator output 119-3, if the START pushbutton 121 is pressed and held in the RECORD mode, the unit may be used as a conventional cassette recorder.

When the START pushbutton 121 is released, the normally-closed contact of the START switch drives the voltage at the junction of R8 and C15 from +VCC (nominally +7.5 volts) to ground. This negative-going voltage change is coupled through C15 to inverter input 126-11, driving the input to ZERO. Inverter output 126-10 goes to ONE. This positive-going voltage change is coupled through C16 to inverter input 127-13, driving the input to ONE, and driving inverter output 127-12 to ZERO. The ZERO at outut 127-12 is fed back through R25 to input 126-11, holding output 126-10 at ONE.

The two inverters 126 and 127 remain in this state (the triggered state) for 0.5 second, after which time C16 charges sufficiently to return inverter input 127-13 to ZERO. When 127-13 goes to ZERO, output 127-12 goes to ONE, driving 126-11 to ONE and 126-10 to ZERO. Therefore, these two inverters and their associated components from a one-shot multivibrator which produces a 0.5 second pulse at inverter output 126-10.

Recording of Leading Stop Tone

The one-shot multivibrator output pulse is applied to NOR gate input 128-1. Since timer output 118-3 remains at logical ONE for 2 seconds after the START pushbutton is pressed (before producing its first negative-going clock pulse), the timer flip-flops 113–116 are still reset at this time. NOR gate inputs 129-3, 129-4 and 129-5 are at ONE, applying a ZERO to NOR gate inputs 128-2 and 128-8. Therefore, the one shot output pulse (at 126-10) drives NOR gate output 128-9 to ZERO for 0.5 second. Since the START pushbutton 121 has been released, input 124-11 is at ZERO, and because the timer flip-flops 113–116 are still reset, input 124-13 is at ZERO. Therefore, NOR gate output 124-10 goes to ONE for 0.5 second, permitting the tone frequency to appear at NAND gate output 125-3 for 0.5 second. The tone is coupled through C17 and R28 to the base of Q13. Since control line "U" is at logical ONE (positive), Q16 is off, the amplifier gain is set for recording, and Q10 is off. Because control line M is at logical ZERO (grounded through a 1K resistance), Q9 and Q11 are turned on. Transistor Q11 returns one side of the record/play (R/P) head to +Vcc, which is signal ground in the amplifier.

The tone is amplified by Q13, Q15 and the output stage, comprising Q17, and Q18. The amplifier output, taken from the junction of C26 and the volume control R200, is coupled through C27 and R49 to the collector of Q9. Since Q9 is turned on by control line "M", the amplifier output is applied to the R/P head and records the tone on the tape. When the one-shot multivibrator 126/127 times out, NOR gate input 128-1 returns to ZERO, turning off the tone output to the audio amplifier.

Recording of Announcement and Transfer Tone

Since the function switch 130 is set to REC, the microphone return is grounded through R5, applying power to the microphone 131. The microphone output amplitude is reduced by the voltage divider composed of R52 and R53, and applied through the function switch to the base of Q14. The microphone audio is amplified by Q14 and applied to the base of Q13. The output of Q13 is further amplified and applied to the R/P head 140 as just described for the leading 0.5 second stop tone.

Approximately two seconds after the $\overline{SRI}$ latch 122 is set, the timer 118 produces a negative-going 0.5 second pulse at its output 118-3. Once the first pulse is produced, subsequent pulses are produced approximately every 4.5 seconds. Therefore, the timer 118 produces an output clock pulse train having a period of approximately 4.5 seconds, which is at logical ONE for approximately 4 seconds, and at logical ZERO for 0.5 second. The clock pulses step the timer flip-flops 113–116 through the states shown in FIG. 3b.

At the leading (negative-going) edge of the fourth clock pulse, approximately 16.5 seconds have elapsed since the setting of the $\overline{SRI}$ latch 122 (2 seconds before the first pulse plus three approximately 4–5 second clock periods). At this time flip-flop outputs 113-14 and 114-2 are at ZERO (see FIG. 3b). When the fourth clock pulse occurs it drives NOR gate input 129-4 to ZERO for 0.5 second, applying a logical ONE to inputs 128-2 and 128-8 for 0.5 second, causing NOR gate output 128-9 to go to ZERO. Since flip-flop output 114-1 is at ZERO at this time, and the START switch 121 is released, the tone enable signal at 124-10 goes to ONE for 0.5 second, and the tone oscillator output 119-3 is gated to the audio amplifier and recorded as previously described.

After this second tone (the transfer tone) is recorded, the trailing edge of the fourth clock pulse steps the timing flip-flop 115 to the next state, setting flip-flop output 115-15 to a logical ONE.

This logical ONE is applied to NAND gate input 134-5. Since the function switch 130 is set to REC, signal ANS is a ONE and NAND gate output 134-4 goes to ZERO. NAND gate output 105-6 is driven to ONE, resetting the CALL flip-flop 110 and extinguishing the CALL indicator 111 to indicate that the ammouncement recording period is completed.

Cycle Completion

Figure 3B:
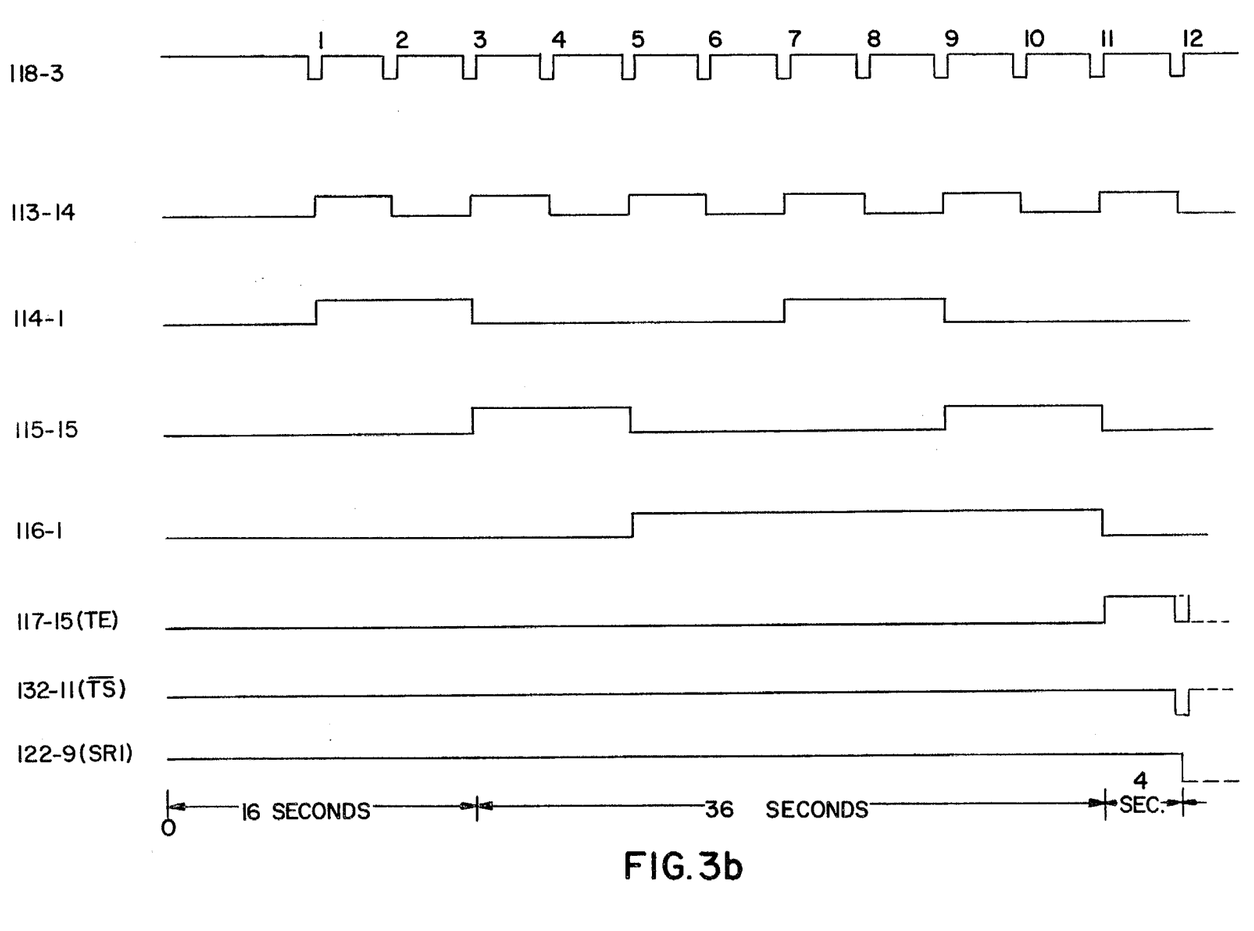
FIG. 3b is a timing diagram respecting the operation of the telephone answering machine shown in FIGS. 1 and 2.

After the CALL indicator is extinguished, the tape continues to drive and the timer flip-flops 113–116 continue to step as indicated in FIG. 3b. When approximately 52 seconds have elapsed the TE flip-flop 117 is set, applying a logical ONE to NAND gate input 132-12. At the next clock pulse, flip-flop output 113-14 goes to ZERO, driving NOR gate output 135-3 to a logical ONE. Since the TE flip-flop 117 is set, the ONE at 135-3 drives signal $\overline{TS}$ (Time Stop, Not) to ZERO.

Signal $\overline{TS}$ is applied to NAND gate input 112-13 as a reset input to the $\overline{SRI}$ latch 112/122. When $\overline{TS}$ goes to ZERO it resets the SRI latch, thereby resetting the timing and TE flip-flops 113-117, and clearing and disabling the timer 118. In addition, with the SRI latch 112/122 reset, the voltage at the cathode of CR7 goes positive, turning off Q2 and removing power from the tape deck motor 123. The record cycle is completed, and the logic circuitry is returned to its original state.

Answer Mode

In the ANSWER mode, the function switch 130 is set to ANS, grounding signal ANS, and the PLAY pushbutton is depressed, closing the tape deck switch 136.

Ring Detection—When the ring voltage (usually 90 volts at 20 Hz.) is present on the telephone line, it is coupled through ring-up transformer T1. The voltage across the secondary of T1 is half-wave rectified by CR8 and the base-emitter junction of Q3, producing input current pulses to the emitter of common-base amplifier Q3. Each time Q3 is turned on, a pulse of current flows from Vcc through CR8, Q3, and R26 into capacitor C14. After two or three ring signals are received, the voltage on C14 increases to the logic threshold voltage.

When signal RING IN reaches the ONE state, inverter output 137-8 goes to ZERO, setting the SRI latch 112/122 to indicate that the ring signal has been detected.

Announcement Transmission—With the SRI latch 112/122 set, the cathode of CR7 is driven negative, turning on Q2 and applying power to the deck motor 123. In addition, SRI (at 122-9) going to ONE sets the CALL flip-flop 110 (lighting the CALL indicator 111 to indicate that a call has been received) and enables NAND gate input 138-8. Since the TE flip-flop 117 is still reset at this time, NAND gate output 138-10 goes to ZERO, turning on Q4 and energizing line relay K1. Relay contact K1 closes, connecting transformer T2 across the line and seizing the line. Since the timing flip-flops 113–116 are still reset, NOR gate inputs 139-5 and 139-6 are both at ZERO, holding NOR gate output 139-4 at ONE. Since signal REC from the function switch 130 is a logical ONE, control line "M" is at logical ONE (positive) and Q1 is turned off. With Q1 turned off, relay K2 is de-energized, and control line "U" is at logical ZERO (ground).

Control line "U" being grounded turns on playback switch transistor Q10 and amplifier gain switch transistor Q16. Transistor Q10 returns one side of the R/P head 140 to +Vcc (amplifier signal ground). Transistor Q16 being on reduces the over-all amplifier gain. As the tape moves past the R/P head 140, the audio voltage generated across the head is applied through C24 to the base of emitter follower Q12. The output of Q12 is applied through the function switch 130 to the base of Q14. After amplification by Q14, Q13, Q15, and output stage Q17/Q18, the amplified playback audio is taken from the junction of C26 and the volume control R200 and applied to the normally closed contact of K2.

Since K2 is de-energized, the audio passes through K2 and is coupled across T2. Since K1 is energized, the audio is coupled through T2 to the telephone line, and the prerecorded announcement is heard by the caller.

Message Reception—During the time that the announcement is being played back and transmitted, the timer 118 is generating clock pulses and stepping the timer flip-flops 113–116 as described for the RECORD mode. After 17 seconds have elapsed from the setting of the SRI latch 112/122, flip-flop 115-15 goes to logical ONE, enabling NOR gate input 139-5. NOR gate output 139-4 goes to ZERO, driving control line M negative and turning on Q1, energizing K2 and the erase head 120, and driving control line U positive. With control line M negative, Q9 and Q11 are turned on (as described for the RECORD mode). Since control line U is positive, Q10 is turned off, and Q16 is turned off to increase the audio amplifier gain. With K2 now energized, audio appearing on the telephone line is coupled through T2, the normally open contact of K2, and the function switch 130 to the base of Q14. The amplified signal is taken from C26 and coupled through C27, R49, and Q9 to the R/P head 140. Therefore, the caller's message is coupled from the telephone line and recorded on the tape segment reserved for the incoming message. Flip-flop output 115-15 holds NOR gate output 139-4 at logical ZERO for approximately 9 seconds and output 116-1 holds it at ZERO for an additional approximately 27 seconds. Therefore, the analog recording (audio amplifier) circuits are enabled for approximately 36 seconds to permit the caller to record his message.

Cycle Termination—At the end of the 36 seconds allowed for recording the incoming message, the TE flip-flop 117 sets. Signal $\overline{TE}$ goes to ZERO, driving NAND gate output 138-10 to ONE. Transistor Q4 turns off and K1 is de-energized, disconnecting T2 from the telephone line. Signal $\overline{TE}$ is also applied to NOR gate input 144-9. Since $\overline{TE}$ was a ONE for the first 52 seconds of the answer cycle, signal STOP TONE was held at ZERO for that time, inhibiting the tone detector output 119-8. Now that $\overline{TE}$ is a logical ZERO, the tone detector output 119-8 is enabled. The tone generator 119 acts as a tone detector in this mode of circuit operation. At the same time that $\overline{TE}$ (117-14) sets, flip-flop outputs 117-15 and 116-1 reset. Therefore, NOR gate output 139-4 goes to ONE, control line "M" goes positive, control line "U" goes negative, and K2 and the erase head 120 are de-energized.

The analog (audio amplifier) circuits are again in the PLAYBACK mode. Audio from the R/P head 140 is coupled through C24 and emitter follower Q12 to the base of Q14. The amplified output is taken from the collector of Q17 and coupled through C12, R16, and C8 to tone detector input 119-3. When the stop tone is played back and detected, tone detector output 119-8 goes to ZERO, driving singal STOP TONE on line 146 to ONE. STOP TONE drives NOR gate input 107-12 to a ONE, thereby producing a ZERO at output 107-11 and resetting the SRI latch 112/122. With the SRI latch reset, Q2 turns off, removing power from the tape deck motor 123, and the timer 118, the timing flip-flops 113–116 and the $\overline{TE}$ flip-flop 117, are reset, and the STOP TONE signal on line 146 goes to ZERO. The unit logic has now returned to its quiescent state and is ready to answer another call.

Play Mode—When the unit is placed in the PLAY Mode, the function switch 130 is set to the PLAY position, grounding signal PLAY. Signal PLAY is applied to NAND gate input 105-5, driving output 105-6 to ONE. The ONE at output 105-6 resets the CALL flip-flop 110, thereby extinguishing the CALL indicator 111.

PLAY is also applied to the cathode of CR6. With PLAY at ground, Q2 turns on, applying power to one side of the motor deck switch 136. If one of the tape deck pushbuttons is depressed, the deck switch 136 closes and tape is driven to rewind, play back, or drive tape fast forward.

Since the timing flip-flops 113–117 remain reset and the REC signal from the function switch 130 is at logical ONE, the cathodes of both CR2 and CR4 are at logical ONE (positive). Therefore, control line U is grounded, placing the analog circuits in the playback mode.

Audio from the R/P head 140 is coupled through C24 and emitter follower Q12 to the base of Q14. The amplified output is coupled through C26 and developed across the volume control R200. Audio at the volume control wiper drives the speaker 150. Note that whatever the mode of operation, audio appearing at the amplifier output is applied to the speaker 150 through the volume control R200, permitting monitoring of playback audio.

I claim:

1. A telephone answering machine utilizing a single magnetic tape having a plurality of announcement information sections interleaved with a corresponding plurality of message information sections, said machine comprising:

a single magnetic record/playback head;

tape transport means;

means comprising said magnetic record/playback head for recording a desired announcement seriatim on each of said announcement information sections of a single track on said tape, and for recording on said track a stop tone immediately preceding each of said sections and a transfer tone immediately following each corresponding section;

announcement control means coupled to said transport means, including said record/playback head and responsive to a telephone ring signal for reproducing said announcement from one of said announcement information sections as a first audio signal;

means for coupling said first audio signal to a telephone line;

message recording means coupled to said transport means, comprising said magnetic record/playback head and responsive to a second audio signal on said telephone line for recording a corresponding message on the particular message information section of said tape adjacent and following said one annoncement information section;

timing means responsive to successive ones of said transfer tones for disabling said announcement control means and enabling said message recording means a first predetermined time after occurrence of said ring signal, and responsive to corresponding successive ones of said stop tones for disabling said message recording means a second predetermined time thereafter; and manually operable playback means including said record/playback head coupled to said transport means for subsequently reproducing from successive ones of said particular message information sections of said tape audible signals corresponding to successive ones of said second audio signals.

2. A telephone answering machine according to claim 1, wherein said announcement information sections and message information sections of said tape have first and second fixed lengths respectively.

3. A telephone answering machine according to claim 1, wherein said timing signals are audio frequency tone signals having a first predetermined duration, said timing signal sensing means having a corresponding first time constant, said machine being capable of switching to a remote playback mode upon receipt of an audio frequency tone control signal having a second predetermined duration, further comprising means for coupling said control signal to said timing signal sensing means, and an auxiliary time constant circuit operatively associated with said sensing means and having a corresponding second time constant for enabling said sensing means to detect said control signal.

4. A telephone answering machine utilizing a single magnetic tape having a plurality of sequentially arranged sets of fixed length announcement and message information sections recorded seriatim on a single track thereof, each announcement information section being following by a message information section, each set having a magnetically encoded audio frequency stop tone signal at the commencement of said announcement information section, a magnetically encoded audio frequency transfer tone signal at the termination of said announcement information section, and another magnetically encoded audio frequency stop tone signal following the termination of said message information section and spaced from said termination by an intersegment gap of predetermined length on said tape, said machine comprising:

a single magnetic record/playback head;

tape transport means for receiving said tape;

means operatively associated with said transport means and comprising said magnetic record/playback head for recording audio signals on said tape, said recording means including a microphone selectively operable in an announcement record mode of said machine;

means operatively associated with said transport means and comprising said magnetic record/playback head for reproducing said encoded audio frequency signals and audio signals from said tape;

a telephone ring detector;

means for coupling said ring detector to a telephone line;

timing means coupled to said ring detector for enabling said transport means when a telephone ring is detected;

decoding control means coupled to said timing and reproducing means, responsive to said encoded signals, and operative in an answer mode of said machine, for (i) enabling said reproducing means, (ii) disabling said reproducing means and enabling said recording means in response to successive ones of said transfer tone signals a fixed time after said reproducing means is enabled, (iii) disabling said recording means and enabling said reproducing means a predetermined time after said reproducing means is disabled in response to the corresponding transfer tone, (iv) activating said decoding control means for sensing the presence of a stop tone signal, and (v) thereafter disabling said recording means in response to a corresponding one of said stop signals;

means operative only in said answer mode for coupling audio signals generated by said reproducing means to said telephone line;

means for coupling audio signals on said telephone line audio signals on the message information section of said tape;

means coupled to said transport means, comprising said record/playback head and operative in said announcement record mode off said machine for (i) generating said encoded stop tone signals and recording the same on said tape in response to successive ones of said start signals, (ii) enabling said microphone immediately thereafter, (iii) generating said encoded transfer tone signal and recording the same on said tape a predetermined time after said start signal, and (iv) disabling said recording means after said transfer tone is recorded; and manually operable means including said reproducing means for audible playback of the audio signals from said telephone line recorded on the message information section of said tape.

5. A telephone answering machine according to claim 4, wherein said timing means includes a clock pulse generator, a tone generator, and a call signal flip-flop, and means for selectively enabling said generators and flip-flop.

6. A telephone answering machine according to claim 4, wherein said recording means and said reproducing means comprise a common audio amplifier.

7. A telephone answering machine according to claim 4, further comprising means coupled to said timing means for setting the gain of said amplifier at a first value when said recording means is operative and a second value when said reproducing means is operative.

* * * * *